May 18, 1937.  C. C. CALKINS  2,080,694
POWDER FEED DEVICE
Filed Dec. 26, 1935
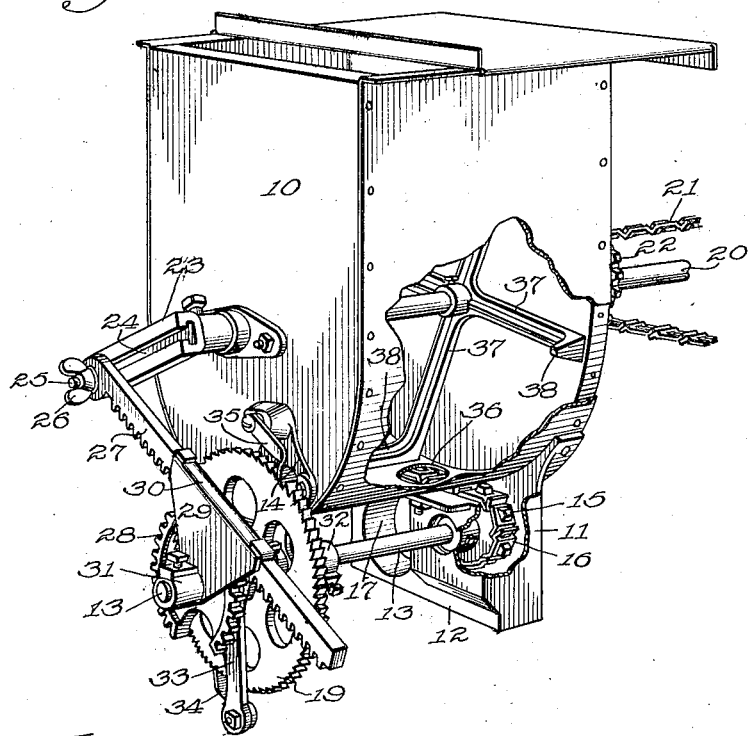

Patented May 18, 1937

2,080,694

UNITED STATES PATENT OFFICE 2,080,694

POWDER FEED DEVICE

Claude C. Calkins, Spokane, Wash.

Application December 26, 1935, Serial No. 56,245

3 Claims. (Cl. 259—46)

This invention relates to powder feed devices, having reference more particularly to devices for distributing chemicals in powdered form on a traveling stream of grain. The general object of the invention is to provide a very simple and practical device that will effect a substantially even and uniform distribution of the powder on the grain, and by which the speed of the feed can be regulated within wide limits.

One simple physical embodiment of the invention is illustrated in the accompanying drawing, in which—

Fig. 1 is a perspective elevation, partly broken out to disclose interior parts.

Fig. 2 is a fragmentary transverse section substantially in plane of the feed shaft.

Fig. 3 is a vertical section on the line 3—3 of Fig. 2.

In the drawing, 10 designates a hopper for the powder preferably formed with a rounded substantially semi-circular bottom which is slightly flattened at the lower end. Attached to the bottom of the hopper 10 at one end thereof is a depending chute 11 formed with a lower open end 12 of reduced width. 13 designates the feed shaft, one end of which is journaled in the outer wall of the chute 11, while its opposite end is journaled in the lower end of a bracket 14 attached to an end wall of the hopper 10. Keyed on the shaft 13 within the chute 11 is a sprocket wheel 15 over which passes an endless sprocket chain 16, the opposite end of the chain being supported and guided over a circular bridge piece 17 mounted between the side walls of the chute, the top lap of the sprocket chain being supported by a plate 18 continuous with the upper end of the bridge 17. Keyed on the other end of the feed shaft 13 outside the supporting bracket 14 is a ratchet disc 19, through which the shaft 13 and sprocket 15 are driven by the following described means.

Journaled in the end walls of the hopper 10 is a drive shaft 20 which may be operated by a chain and sprocket drive 21, 22 from any suitable source of power. On the other end of shaft 20 is keyed a crank arm 23 formed on its outer side with an under cut groove 24 to receive the head of a bolt 25. Secured on the bolt 25 by a wing nut 26 is a rack bar 27, the teeth of which are engaged with a segmental pinion 28 loose on the shaft 13, the rack bar 27 being confined against rising by a shield 29 pivoted at its lower end on the shaft 13 and having a channeled upper end portion 30 overlying the top edge of the rack bar 27. A collar 31 keyed on the outer end of shaft 13, and a similar collar 32 keyed on the shaft 13 inwardly of the bracket 14 confine the members 19, 28 and 29 against lateral displacement. Attached to the inner side of the segment pinion 28 is an arm 33 on the lower end of which is pivoted a spring pressed pawl 34 that cooperates with the teeth of the ratchet disc 19.

In the bottom wall of the hopper is an opening 36 directly overlying the chain 16 through which the powder in the hopper falls onto the chain. Keyed on the drive shaft 20 within the hopper is a reel or spider formed with radial arms 37 and paddles 38 that agitate the powder, prevent its packing, and cause it to flow in a substantially continuous stream through the hole 36 onto the sprocket chain, from which latter the powder falls in a practically uniform stream onto the stream of grain traveling through a chute or on a conveyor (not shown) underlying the open end of the feed chute 12. Only one of the paddles 38 needs to be of sufficient length to extend across the full width of the hopper. The other paddles need only be of sufficient length to wipe across the outlet 36.

The extent of movement imparted to the chain 16 by each intermittent rotary movement of the shaft 20 can be widely varied by shifting the connection of the rack bar 27 to the crank arm 23 lengthwise of the latter. The rack bar may be set so close to the axis of shaft 20 that the ratchet disc 19 will be rotated to the extent of only a single tooth; or, by connecting the rack bar to the outer end of the crank arm, the ratchet disc may be rotated to the extent of a large number of teeth. By thus adjusting the rack bar to any desired position on the crank arm, the rate of powder feed can be varied as required or desired.

The feeding of the powder through the agency of a moving sprocket chain is a novel and important feature of the present invention. The described drive for the sprocket chain is very satisfactory by reason of the very wide range of adjustment of the speed of the feed which it affords; but other means for driving the feed shaft 13 may be employed within the purview of the invention as defined in the appended claims.

I claim:

1. In a powder feed device of the class described, the combination of a hopper having a fixed bottom wall with an opening therein, a depending discharge chute attached to said bottom wall and underlying said opening, a sprocket chain mounted in said chute to travel across said opening, and means for driving said chain.

2. In a powder feed device of the class described, the combination of a hopper having a fixed internally concave bottom wall formed with a hole in its lowest part, a depending discharge chute attached to said bottom wall and underlying said hole, a sprocket chain mounted in and extending between opposite sides of said chute to travel across said hole, and means for driving said chain.

3. In a powder feed device of the class described, the combination of a hopper having a fixed internally concave bottom wall formed with a hole in one side of its lowest part, a depending discharge chute of less width than said hopper attached to said bottom wall and underlying said hole, a sprocket chain mounted in and extending between opposite sides of said chute to travel across said hole, and means for imparting intermittent movements to said chain, said means being adjustable to vary the length of said movements.

CLAUDE C. CALKINS.